Figure 1:
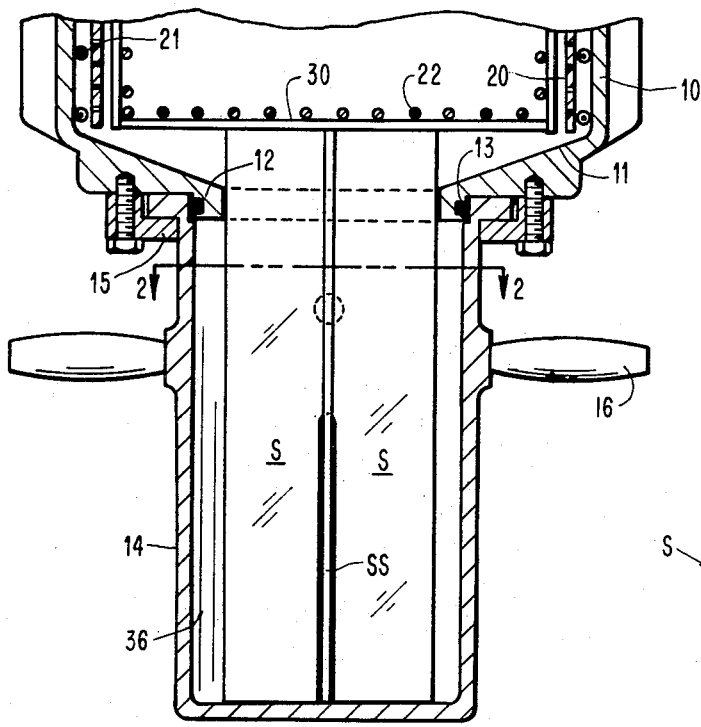

United States Patent
Pottinger et al.

[15] 3,667,375
[45] June 6, 1972

[54] MEANS FOR MELTING CONGEALED LIQUID AND FOR PREVENTING CONGELATION

[72] Inventors: Eugene A. Pottinger, Louisville; Winston L. Shelton, Jeffersontown, both of Ky.

[73] Assignee: Commercial Appliances, Inc.

[22] Filed: Feb. 24, 1971

[21] Appl. No.: 118,283

[52] U.S. Cl.............................................99/408, 210/153
[51] Int. Cl. ......................................................A47j 37/12
[58] Field of Search.................99/408, 447, 446, 416, 418, 99/415; 210/153, 167, 171

[56] References Cited

FOREIGN PATENTS OR APPLICATIONS

| 345,410 | 10/1904 | France | 99/416 |
| 661,921 | 4/1950 | Great Britain | 99/408 |
| 622,425 | 6/1961 | Canada | 99/408 |

Primary Examiner—Leon G. Machlin
Attorney—William E. Sherwood

[57] ABSTRACT

A heat-conductive member having an upper portion in contact with a bath of hot cooking liquid is detachably mounted in a collector unit of a pressure cooking vessel and by its presence serves to melt congealed liquid in said unit and without interference with the normal functioning of the cooking operation.

2 Claims, 3 Drawing Figures

PATENTED JUN 6 1972                    3,667,375

INVENTORS
EUGENE A. POTTINGER
WINSTON L. SHELTON

BY  W.E. Sherwood
                    ATTORNEY

MEANS FOR MELTING CONGEALED LIQUID AND FOR PREVENTING CONGELATION

BACKGROUND OF THE INVENTION

In the pressure frying of various foods such as chicken, shrimp, potatoes or the like optimum operation of the cooking apparatus requires that the particles of food detached from the breaded portions immersed in the hot cooking liquid be segregated from the liquid. In our copending application, Ser. No. 76,557 filed Sept. 29, 1970 an improved pressure cooking apparatus incorporating a detachable collector unit is disclosed and a normal operation for such an apparatus is described.

Under certain conditions, however, as when starting operations are conducted with the cooking vessel containing a body of liquid which may be in partially or wholly congealed form, a delay in start-up may occur due to the presence of congealed material in the collector unit. In addition, it is important that the contents of the collector unit be kept in flowable form during the operation of the apparatus following its start up. A requirement accordingly exists for a means which can not only render the collector unit rapidly serviceable, as when the apparatus has rested overnight in a cold atmosphere with the vessel and collector unit containing the necessary liquid material for the next day's operation, but also which will maintain the serviceability of that unit during the entire operation of the apparatus. Such means, moreover, should be simple and without requiring heating coils and without interfering with the normal operation as described in the afore-mentioned application. It is a purpose of the present invention to satisfy requirements of this nature.

SUMMARY

A heat-conducting member formed of a material having a high coefficient of heat conductivity and of a size fitting within a collector unit and extending into a bath of hot cooking liquid contained in a vessel to which the collector unit is detachably secured represents an essential part of the invention. Preferably, the member comprises a pair of interleaved bifurcated sheets of a metal, such as aluminum, which when mounted in combination with the vessel and the collector unit will not interfere with the normal collecting function or the draining of liquid from the unit.

Among the objects of the invention are the provision of an inexpensive heat-conducting member suitable for melting congealed cooking liquid and for preventing congelation of such liquid during the operation of a pressure cooking apparatus; the provision of a heat-conducting member adapted for ready insertion in or removal from a collector unit of a pressure-cooking vessel; the provision of an improved heat-conducting member formed of interleaved bifurcated sheets of metal; and the provision of a heat-conducting member which when arranged in combination with a vessel containing a hot cooking liquid and an attached collector unit for receiving food particles dropping from the vessel will not interfere with the normal operation of the combined cooking apparatus.

Figure 3:
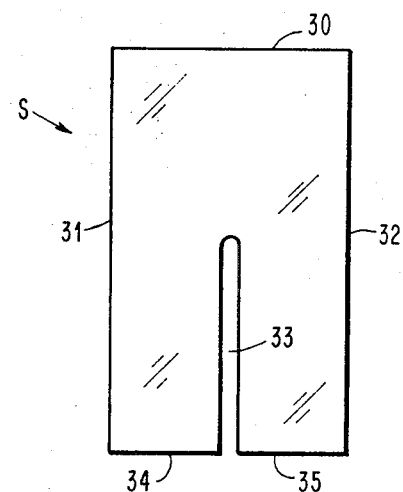
Figure 2:
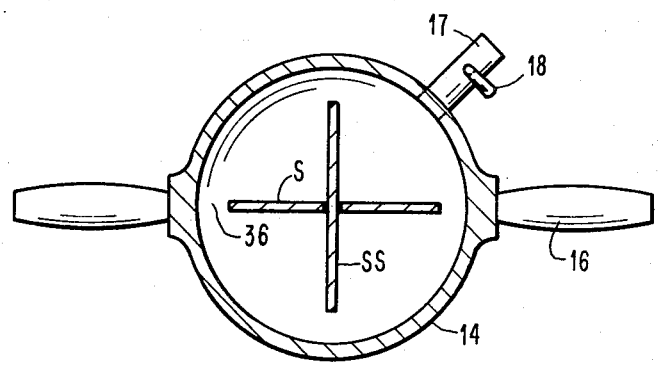

These and other objects and advantages of the invention will become more apparent as the description proceeds and when considered in conjunction with the accompanying drawings in which FIG. 1 is a sectional view of a portion of the cooking apparatus with the heat-conducting member in place and shown in elevation, FIG. 2 is a sectional view taken on line 2—2 of FIG. 1 and FIG. 3 is a side elevation view of one of the leaves of the heat-conducting member.

Referring now to FIG. 1, a pressure cooking apparatus of the type disclosed in the afore-mentioned application and with which the present invention may be conveniently employed preferably comprises a stainless steel cooking vessel with a tubular wall 10. The lower wall portion 11 slopes toward the central lower opening of the vessel and includes an annular boss 12 on the outer periphery of which a slot is formed for retention of an O-ring seal 13. A cup-shaped collector unit 14 preferably formed of stainless steel has a smooth inner periphery at the top and bears against the seal. The unit is detachably locked in operative position with a conventional cam lock structure 15 mounted on the lower side of the vessel wall portion 11. A plurality of handles 16 projecting laterally from the collector unit enable that unit to be unlocked and removed at appropriate times. Also attached to the unit near the top portion thereof is a downwardly inclined drain pipe 17 having a valve 18 therein.

Suitably supported from the upper portion of the cooking vessel is a tubular perforated sleeve 20 serving as a shield for a plurality of heating coils 21 suitably energized by an electrical control system; such coils being mounted on the inner surface of wall 10 and below the normal level of the cooking liquid contained therein. A foraminous basket 22 for containing food to be cooked is in turn mounted within the sleeve and as the coils heat the liquid a convection current of hot liquid, which for example may be at about 400° F, circulates within the vessel.

Particles of food dropping from the basket and having a specific gravity greater than that of the heated liquid accordingly enter the collector unit and are segregated from the main body of liquid and are kept from contact with the hot coils. When the collector unit is filled with food particles, or at the end of a day's operation, the valve 18 is opened to drain liquid from the vessel and thereafter the unit is unlocked by manipulation of the handles and is removed for cleaning of the collected particles therefrom. When, however, due to a congealing of the liquid in the collector unit such particles are unable to move to the bottom of the unit, a less efficient operation will result. Some means, therefore, are required to insure that such congealing will not occur.

Referring now to FIGS. 2 and 3, a solution to this problem has been found in the provision of a heat-conductive member which by its construction and presence in combination with the vessel and collector unit insures that the intended segregation of the food particles will take place. One simple, inexpensive and reliable means includes a pair of interleaved bifurcated sheets of generally rectangular form and formed of aluminum. As seen in FIG. 3, one such sheet S comprises a top edge 30, parallel side edges 31, 32, and a central slot 33 extending at least half of the length of the sheet from its bottom edges 34, 35. The length of the sheet is such that a substantial portion thereof extends into the vessel in contact with the hot liquid therein and conveniently the upper end of the sheet may provide a support for the bottom of the basket 22. The bottom edges of the sheet are supported by the bottom of the collector unit and significantly the edges 31, 32 of the sheet are spaced from the side wall of the collector unit so as to leave a peripheral space 36 providing communication between the sectors of that unit and with the outlet pipe 17.

An identical sheet SS interleaved with sheet S in inverted position completes the assembly and when installed in the collector unit these interleaved sheets do not interfere with the convection flow of the hot liquid in the vessel nor do they interfere with the uniform settling of food particles into the collector unit. By selecting a material of appropriate high coefficient of heat conductivity, and of sufficient mass, for these sheets, congealing of cooking liquid in the collector unit may be prevented during operation of the cooking apparatus and if any congealed material is present at the start-up of the apparatus it will be rapidly melted.

The described heat-conducting member is loosely positioned within the collector unit and may be removed upwardly through the vessel, or remain with the collector unit as it is detached from the vessel. Moreover, it may be easily cleaned and maintained in sanitary condition. The described arrangement of sheets S and SS moreover serves to divide the interior of the collector unit into substantially equal sectors and to transmit heat substantially uniformly to the contents of that unit within those sectors.

Obviously, other modifications and variations of the present invention are possible in the light of the above teachings. It is, therefore, to be understood that within the scope of the appended claims the invention may be practiced otherwise than as specifically described.

What is claimed is:

1. For use with a pressure cooking apparatus having a vessel containing a hot cooking liquid and with a hollow collector unit attached to a lower portion of the vessel and adapted jointly to receive food particles dropping from said vessel and to serve as a drain for liquid from said vessel; the improvement comprising a heat-conducting member detachably supported within said unit and projecting into said vessel and receiving substantially all of its heat from its contact with said liquid, said member serving to conduct heat into the contents of said unit and to melt congealed liquid contained therein, said member comprising at least one sheet of metallic material having a high coefficient of heat conductivity and with the side edges of said sheet being spaced from the side walls of said unit.

2. Apparatus as defined in claim 1 wherein said member comprises a pair of bifurcated sheets of metallic material each having a high coefficient of heat conductivity, said sheets being detachably interfitted to provide a uniform length of the assembled member and each having their side edges spaced from the side walls of said unit.

* * * * *